United States Patent
Young

Patent Number: 5,878,800
Date of Patent: Mar. 9, 1999

[54] RECTANGULAR OPENING BOX CUTTING APPARATUS

[76] Inventor: Ralph C. Young, 2119 Payton Cir., Colorado Springs, Colo. 80915-1330

[21] Appl. No.: 12,406

[22] Filed: Jan. 23, 1998

[51] Int. Cl.$^6$ ............................... B23C 1/20; B27C 5/10; B27M 3/00

[52] U.S. Cl. .............................. 144/372; 30/372; 83/745; 144/136.5; 144/136.95; 144/364; 144/368; 144/371; 144/48.6; 144/144.1; 144/144.51; 144/73

[58] Field of Search ................................. 30/372; 83/745; 144/134.1, 136.95, 136.5, 48.6, 154.5, 371, 368, 364, 144.1, 144.51, 72, 73

[56] References Cited

U.S. PATENT DOCUMENTS

| | | | |
|---|---|---|---|
| 2,679,271 | 5/1954 | Patten | 144/136.5 |
| 4,048,720 | 9/1977 | Wheeler | 30/372 |

FOREIGN PATENT DOCUMENTS

| | | | |
|---|---|---|---|
| 556102 | 8/1932 | Germany | 144/136.5 |

Primary Examiner—W. Donald Bray
Attorney, Agent, or Firm—G. F. Gallinger

[57] ABSTRACT

The traditional method of carving out an electrical outlet box opening in a log wall consists of chiselling after a series of closely spaced holes are drilled in the log. It is a time consuming and difficult undertaking. An apparatus for quickly and easily cutting a rectangular opening in a log wall is disclosed. The apparatus comprises: a saw jig, having a central opening, for mounting on an upright side of the log wall; a cutting drum having teeth around its periphery; drive means to revolve the cutting drum; and, a guide arm attached to the jig to guide the revolving drum into the central opening. Most preferably the drive means is a chain saw. A method of cutting a rectangular opening in a log wall comprises the following steps: mounting a jig having a central opening and a guide arm, on an upright side of the wall; and, guiding a revolving drum having teeth on its periphery through the central opening into the wall using the guide arm on the jig. A flat face plate mounting surface around the rectangular opening in the log wall is the provided by: mounting a flat jig having a rectangular central opening therein over the rectangular opening on the wall; and then, guiding a router around the rectangular opening in the flat jig.

18 Claims, 1 Drawing Sheet

RECTANGULAR OPENING BOX CUTTING APPARATUS

FIELD OF INVENTION

This invention relates to an apparatus for cutting rectangular openings beneath a surface. More particularly this invention relates to an apparatus and method of cutting openings for electrical outlet boxes in an exterior wall constructed of logs.

BACKGROUND OF THE INVENTION

Log cabins and homes having exterior walls made from horizontally stacked logs have a simplistic, rustic, and rugged appeal. A log wall which is several inches of solid wood thick does not need to be insulated. Before an electrical outlet box can be mounted on the interior slide of the wall a rectangular opening must be made in the solid wood to accommodate the electrical outlet box. Traditionally the ordeal of carving out the opening has been done with a wood chisel after a series of closely spaced holes are drilled in the log. It is a time consuming and difficult undertaking.

OBJECTS AND STATEMENT OF INVENTION

It is an object of this invention to disclose an apparatus used to bore out a rectangular opening beneath a surface. It is an object of this invention to disclose a tool used to cut out a rectangular opening which does not have a plug of material to remove from the cutting tool after the opening is cut. It is yet a further object of this invention to disclose an apparatus and method which can be used to rapidly bore out and precisely position rectangular openings in a log wall, with a minimal amount of effort, and in a fraction of the time expended in the traditional approach. It is yet a final object of this invention to disclose an apparatus and method which will produce and finish rectangular openings in a log wall to accommodate electrical outlet boxes having flat face plates.

One aspect of this invention provides for an apparatus, for cutting a rectangular opening beneath a surface, which comprises: a saw jig, having a central opening, for mounting on the surface; a cutting drum having teeth around its periphery; drive means to revolve the cutting drum; and, a guide arm attached to the saw jig to guide the revolving drum into the central opening. The revolving cutting drum is guided through the central opening beneath the surface thereby cutting out a rectangular opening.

Another aspect of this invention provides for a method of cutting a rectangular opening in a log wall comprising the following steps: mounting a jig having a central opening and a guide arm, on an upright side of the wall; and, guiding a revolving drum having teeth on its periphery through the central opening into the wall by using the guide arm on the jig.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein.

Figure 1:
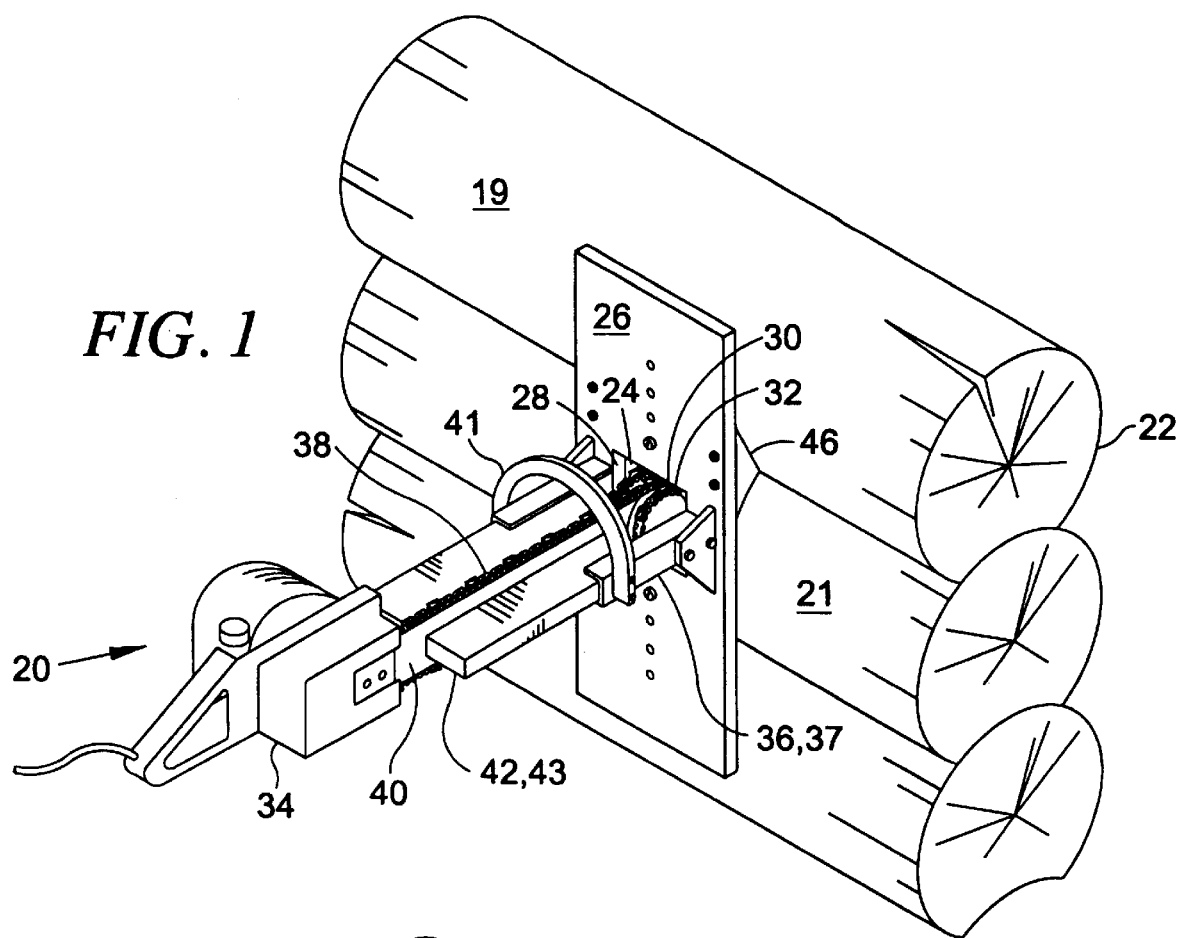
FIG. 1 is a perspective view of a rectangular opening cutting apparatus mounted on the surface of a log wall.

The following is a discussion and description of the preferred specific embodiments of this invention, such being made with reference to the drawings, wherein the same reference numerals are used to indicate the same or similar parts and/ or structure. It should be noted that such discussion and description is not meant to unduly limit the scope of the invention.

DESCRIPTION OF THE INVENTION

Turning now to the drawings and more particularly to FIG. 1 we have a perspective view of rectangular opening cutting apparatus 20 mounted on the surface 19 of a log wall 22. The apparatus 20 for cutting a rectangular opening 24 beneath the surface 19 of a log wall 22 comprises: a saw jig 26, having a central opening 28, for mounting on the surface 19; a cutting drum 30 having teeth 32 around its periphery; drive means which most preferably is an electric chain saw 34 to revolve the cutting drum 30; and, a guide arm 36 attached to the jig saw 26 to guide the revolving drum 30 into the central opening 28 in the jig saw 26. The chain saw 34 has a chain 38 and a chain guide 40. The cutting drum 30 is held by an end portion of the chain guide 40 and driven by the chain 38.

Most preferably the guide arm 36 comprises two U shaped tracks 37, one extending from each opposite side of the central opening 28. There are two matingly sized elongated guide members 42, one attached to each opposite side of the chain guide 38 on the chain saw 34. Most preferably the guide members 42 are generally rectangular blocks 43, sized to fit matingly within the channels 37. Each guide arm 36 is adapted to slidably receive one of the elongated guide members 42 which are attached to a central portion of the chain guide 40 on the chain saw 34. In the most preferred embodiment the guide arms 36 are spaced with a connecting stabilizer 41. The connecting stabilizer 41 also serves as a handle for lifting and positioning the apparatus 20.

Different shapes of cutting teeth 40 were experimentally tested. It was found that fastest cutting was achieved when the revolving drum 30 was wrapped with a cutting chain 38 so that the cutting teeth 32 on the drum 30 comprised portions of the cutting chain 38.

In a preferred aspect of the invention the saw jig 26 has a positioning tooth 46 which extends partially between two logs 21 in a log wall 22 so that the saw jig 26 is properly positioned on a log 21 to ensure that the opening 24 in the wall 22 is vertically centered in the log 21.

Figure 2:
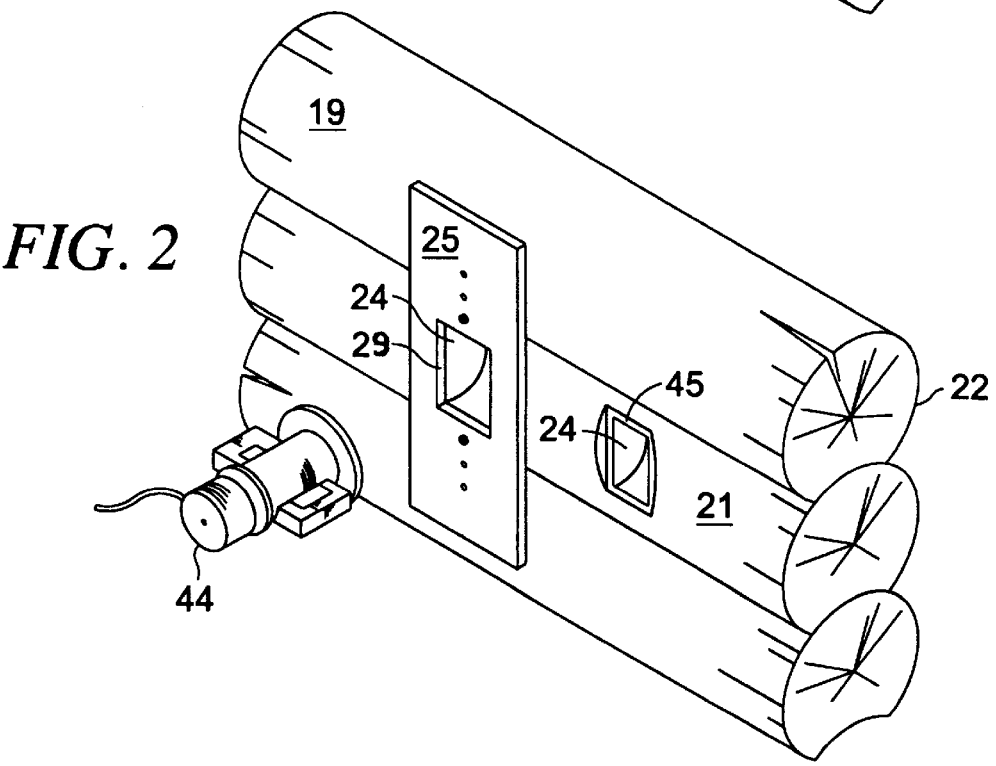
FIG. 2 is a perspective view of an accessory flat jig mounted on the surface of a log wall. The accessory flat jig is used in conjunction with a router to provide a flat face plate mounting surface around a rectangular opening in a log wall.

FIG. 2 is a perspective view of an accessory flat jig 25 mounted on the surface 19 of a log wall 22. The accessory flat jig 25 is used in conjunction with a router 44 to provide a flat face plate mounting surface 45 around a rectangular opening 24 in the log wall 22.

A method of cutting a rectangular opening in a log wall 22 comprises the following steps: mounting a jig saw 26 having a central opening 28 and a guide arm 36, on an upright side of the wall 22; and guiding a revolving drum 30 having teeth 32 on its periphery through the central opening 28 into the wall 22 by using the guide arm 36 on the jig saw 26. Most preferably the revolving drum 30 is driven by a drive means comprising a chain saw 34 having a chain 38 and a chain guide 40. The revolving drum 30 is held by an end portion of the chain guide 40 and driven by the chain 38.

In this method, most preferably the guide arm 36 comprises a two tracks which are U shaped channels 37, one extending from each opposite side of the central opening 28.

The channels 37 are adapted to slidably and matingly receive two elongated guide members 42 which are generally rectangular blocks 43, one attached to each opposite side of the chain guide 40. Most preferably, the guide arms 36 are spaced with a connecting stabilizer 41 and the revolving drum 30 is wrapped with a cutting chain 38 so that the cutting teeth 32 on the drum 30 comprise portions of the cutting chain 38.

In the most preferred method, the central opening 28 is rectangular, and the further steps of removing the apparatus 20 from the wall 22, mounting a flat jig 25 on the wall 22 and then guiding a router 44 around the rectangular opening 29 in the flat jig 25 are undertaken to provide a flat face plate mounting surface 45 around the rectangular opening 24.

In current practice after a rectangular opening 24 in a log wall 22 is cut, a flat face plate mounting surface 45 around the rectangular opening 24 is cut out with a hammer and a wood chisel (neither shown). A much faster and easier method of providing a flat face plate mounting surface 45 around a rectangular opening 24 in a log wall 22 comprises the following steps: mounting a flat jig 25 having a rectangular central opening 29 therein over the rectangular opening 24 on the wall; and then, guiding a router 44 around the rectangular opening 29 in the flat jig 25 to provide a flat face plate mounting surface 45 around the rectangular opening 24 in the log wall 22.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. An apparatus for cutting a rectangular opening beneath a surface comprising:

a saw jig, having a central opening, for mounting on the surface;

a cutting drum having teeth around its periphery;

drive means to revolve the cutting drum; and, a guide arm attached to the saw jig to guide the revolving drum through the central opening;

wherein use the revolving cutting drum is guided through the central opening thereby cutting a rectangular opening beneath the surface.

2. An apparatus as in claim 1 wherein the drive means comprises a chain saw having a chain and a chain guide, and wherein the cutting drum is held by an end portion of the chain guide and driven by the chain.

3. An apparatus as in claim 2 wherein the guide arm comprises a track adapted to slidably receive an elongated guide member attached to a central portion of the chain guide on the chain saw.

4. An apparatus as in claim 3 wherein there are two guide arms, one extending from each opposite side of the central opening, and wherein there are two guide members, one attached to each opposite side of the chain guide on the chain saw.

5. An apparatus as in claim 4 wherein the guide arms comprise a U shaped channel, and wherein the guide members comprise a generally rectangular block sized to fit matingly within the channels.

6. An apparatus as in claim 5 wherein the guide arms are spaced with a connecting stabilizer.

7. An apparatus as in claim 5 wherein the revolving drum is wrapped with a cutting chain so that the cutting teeth on the drum comprise portions of the cutting chain.

8. An apparatus as in claim 5 further comprising an accessory flat jig used to rout a flat face plate mounting surface around a rectangular opening in a log wall.

9. An apparatus as in claim 6 further comprising a positioning tooth, projecting on the saw jig towards the surface, used when positioning the saw jig on the surface of a log wall to ensure that the opening in the wall is vertically centered in the log.

10. A method of cutting a outlet box opening in a log wall comprising the following steps:

mounting a saw jig having a central opening and a laterally extending guide arm, on an upright side of the wall; and then, guiding a revolving drum having teeth on its periphery through the central opening into the wall with the guide arm on the jig;

thereby cutting a rectangular opening in the wall.

11. A method as in claim 10 wherein the revolving drum is driven by a drive means comprising a chain saw having a chain and a chain guide, and wherein the revolving drum is held by an end portion of the chain guide and driven by the chain.

12. A method as in claim 11 wherein the guide arm comprises a track adapted to slidably receive an elongated guide member attached to a central portion of the chain guide on the chain saw.

13. A method as in claim 12 wherein there are two guide arms, one extending from each opposite side of the central opening and wherein there are two guide members, one attached to each opposite side of the chain guide on the chain saw.

14. A method as in claim 13 wherein the guide arms comprise a U shaped channel, and wherein the guide members comprise a generally rectangular block, sized to matingly fit within the channels.

15. A method as in claim 14 wherein the end portions of the guide arms are spaced with a connecting stabilizer.

16. A method as in claim 15 wherein the revolving drum is wrapped with a cutting chain so that the cutting teeth on the drum comprise portions of the cutting chain.

17. A method as in claim 10 further comprising the steps of:

removing the saw jig from the wall;

mounting a flat jig having a rectangular central opening therein over the rectangular opening on the wall; and then, guiding a router around the rectangular opening in the flat jig to provide a flat face plate mounting surface around the rectangular opening in the wall.

18. A method of providing a flat face plate mounting surface around a rectangular opening in a log wall comprising the following steps:

mounting a flat jig having a rectangular central opening therein over the rectangular opening on the wall; and then, guiding a router around the rectangular opening in the flat jig to provide a flat face plate mounting surface around the rectangular opening in the wall.

* * * * *